May 17, 1960 — R. M. TUCK ET AL — 2,936,865
TRANSMISSION AND CONTROL SYSTEM
Filed June 21, 1956 — 3 Sheets-Sheet 1

INVENTORS
Robert M. Tuck &
BY Fred Snoy
W. C. Middleton
ATTORNEY

May 17, 1960 R. M. TUCK ET AL 2,936,865
TRANSMISSION AND CONTROL SYSTEM
Filed June 21, 1956 3 Sheets-Sheet 3
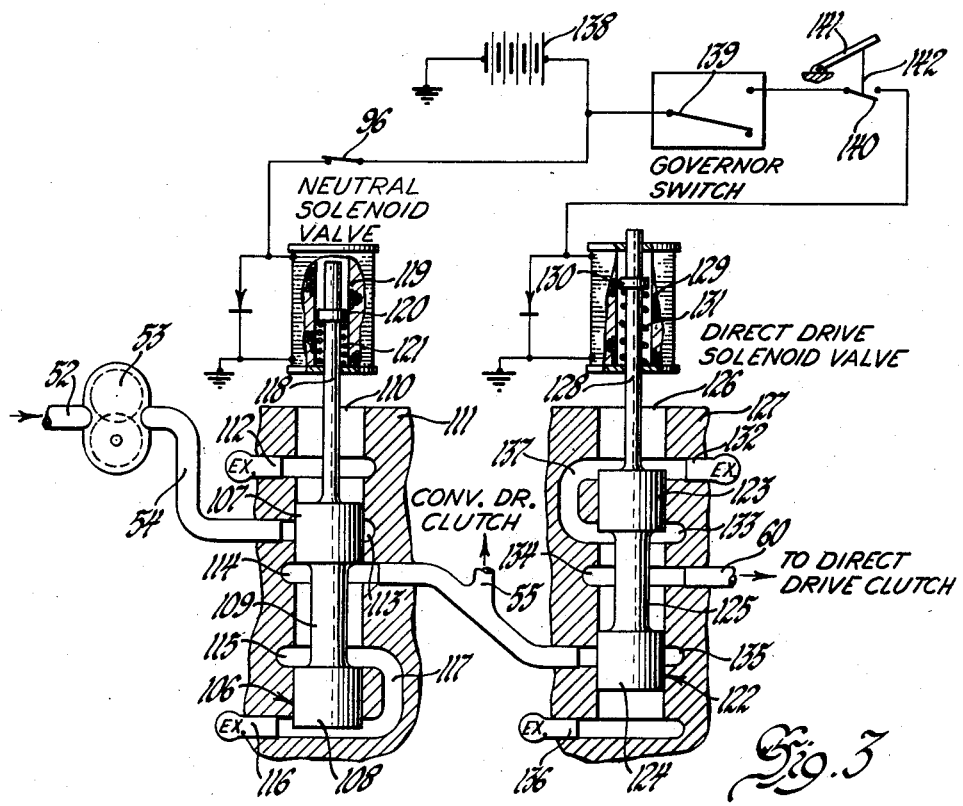
Fig. 3
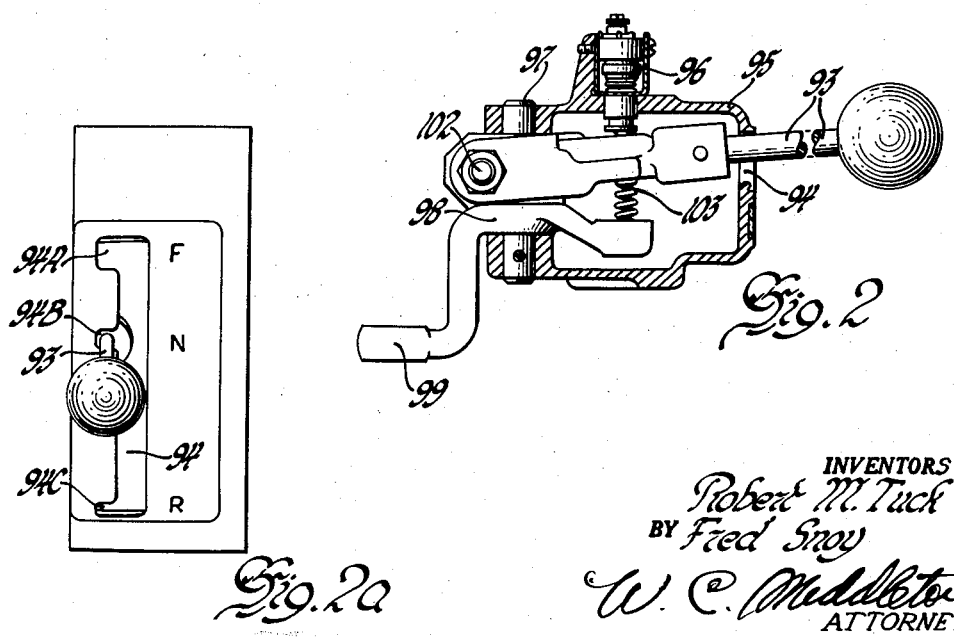
Fig. 2
Fig. 2a
INVENTORS
Robert M. Tuck &
BY Fred Snoy
W. C. Middleton
ATTORNEY

# United States Patent Office 2,936,865
Patented May 17, 1960

2,936,865

TRANSMISSION AND CONTROL SYSTEM

Robert M. Tuck and Fred Snoy, Indianapolis, Ind., assignors to General Motors Corporation, Detroit, Mich., a corporation of Delaware Application June 21, 1956, Serial No. 592,949

19 Claims. (Cl. 192—.096)

This invention relates to transmission drive mechanism for vehicles and the control system therefor, in which hydrodynamic fluid torque converter devices are incorporated for providing infinitely variable drive ratio changes with torque multiplication, and incorporating a direct drive clutch mechanism for direct drive without torque multiplication. The clutching arrangement whereby change between torque converter drive and direct drive is accomplished and the control system therefor include structural features departing from certain teachings in this art as set forth in detail below.

An object of this invention is to provide a transmission structure including a clutch adapted to be engaged for torque multiplication drive through a torque converter and a second clutch adapted to be engaged for direct drive through the transmission without torque multiplication.

Another object of this invention is to provide in a transmission of the type described a pair of clutches selectively engageable to provide drive through different torque paths and having fluid pressure responsive servo motors adapted to selectively engage the clutches wherein one clutch servo motor is constructed and arranged to apply one clutch and release the other clutch irrespective of the action of the other clutch servo motor.

A further object of this invention is to provide in a transmission of the type described a pair of clutches selectively engageable to provide drive through different torque paths wherein one clutch member may be actuated to establish drive through one path and to release the other clutch member as it is being engaged so that change of drive from one torque path to another is accomplished with torque overlap so as to prevent engine runaway.

An additional object of this invention is to provide in a transmission of the type disclosed a simple, inexpensive and reliable control system wherein control valving is arranged to continuously direct fluid pressure to one servo member to apply one clutch and to selectively direct fluid pressure to a second clutch servo to apply a second clutch to change the torque path so that shift under torque may be accomplished during operation of the vehicle without relaxing the engine throttle.

Another object of this invention is to provide in a transmission of the type described a control system incorporating a minimum number of valves constructed and arranged to provide for neutral and forward drive through one of two torque paths wherein a second valve is arranged in series with a first valve such that the first valve may establish neutral or no drive irrespective of the position of the second valve.

A further object of this invention is to provide in a transmission of the type described a control system and clutch actuator arrangement constructed to provide for change of drive from one torque path to another with torque overlap during the shift interval and incorporating first and second valves in series connection such that the second valve may be positioned to cause a change in the torque path without disturbing the position of the first valve.

Another object of this invention is to provide in a transmission of the type described a pair of clutches adapted to be selectively engaged to provide drive through different torque paths wherein a clutch backing member is engaged during initial engagement of one clutch to effect release of a second clutch and to provide an initial accumulator effect to assure smooth transfer of torque between the clutches without jerk and without excessive clutch slippage.

These and other objects and advantages of the invention will be apparent from the following specification and claims taken in conjunction with the drawings in which:

Figure 1A is a developed view of the rear portion of the transmission and adapted to be driven through the clutching arrangement of Figure 1 to illustrate the gearing arrangement.

Figure 2A is a view of the external portion of the control handle for controlling the slide gear unit and the slots in the casing adapted to receive the handle.

Figure 3 is a schematic view of a control system for controlling the clutches of Figure 1.

Figure 1:
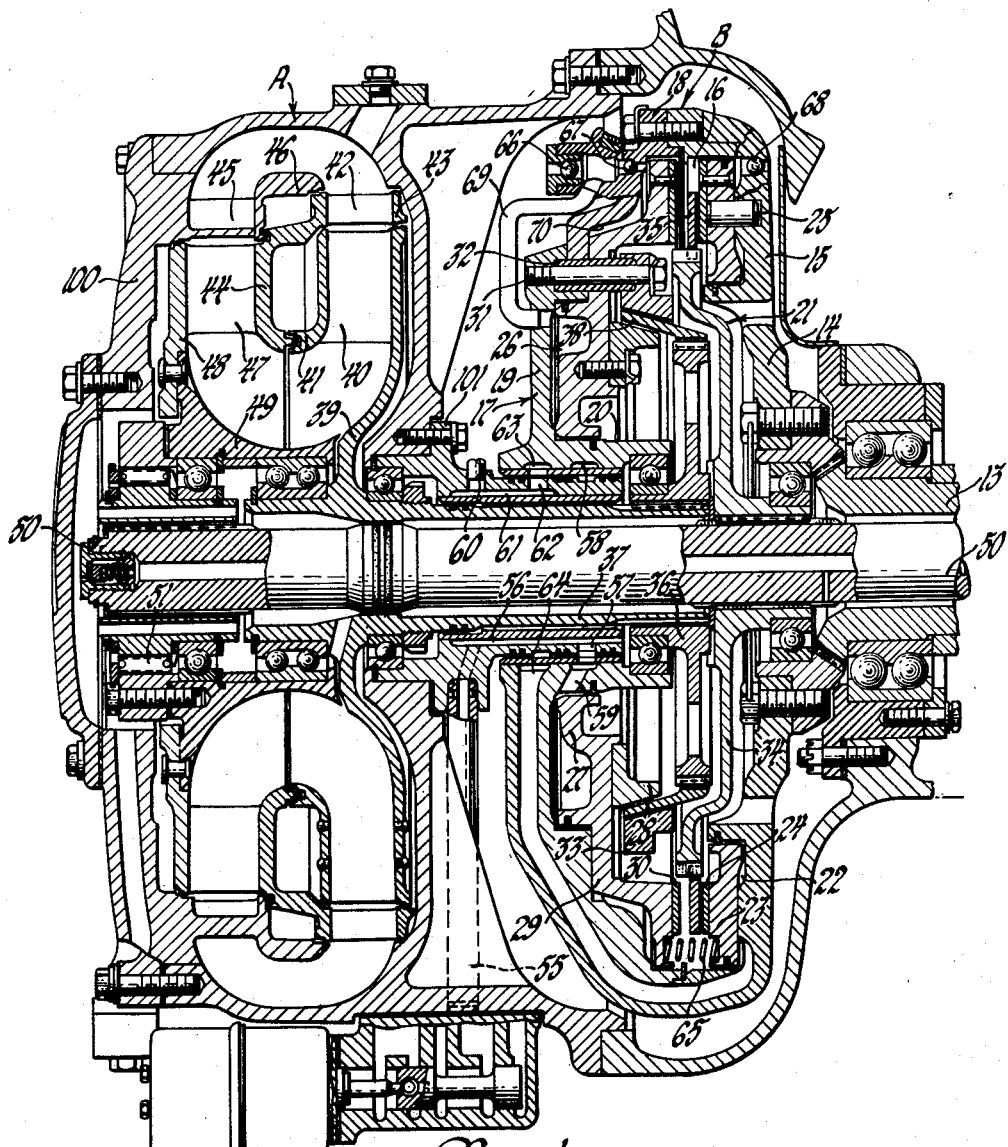
Figure 1 is a vertical sectional view of the front portion of a transmission constructed and arranged in accordance with the principles of this invention.

Referring to Figures 1 and 1A, the transmission assembly includes a hydrodynamic torque converter unit A, a clutching unit B, and a manually shiftable slide gear unit C for providing forward, neutral and reverse drive.

In Figure 1A, an engine driven power input shaft 10 is adapted to drive an intermediate shaft 50 through either the torque converter unit A or directly, as hereafter explained. Intermediate shaft 50 may be connected to a final output or load shaft 105 for either forward or reverse drive of shaft 105 through the manually shiftable slide gear unit C. Gear unit C may also provide for a positive neutral wherein shaft 105 is disconnected from shaft 50.

Engine drum shaft 10 has affixed thereto a bevel gear 11 adapted to drive a clutch drum 14 by means of a bevel gear 12 in mesh with gear 11 and fixed to a sleeve 13, the sleeve 13 being bolted to clutch drum 14. Drum 14 is shaped to provide a radially projecting flange 15, there being an axially extending cylinder portion 16 at the outer periphery of the radial section 15. Bolted to the cylindrical portion 16 of drum 14 is a closure member 17 having an axially extending cylindrical portion 18 and a radially extending portion 19. At the inner periphery of closure member 17 there is formed thereon an axially extending cylindrical boss 20. The members 14 and 17 in assembled relation form an enclosed clutch chamber 21.

Drum 14 is shaped to provide a cylinder 22 extending into clutch chamber 21 and adapted to receive a clutch actuating piston 23 positioned therein for axial motion with respect to the axis of rotation of drum 14. Piston 23 carries a clutch facing 24 affixed thereto and is pinned to drum 14 by means of a series of pins 25, there being a single pin 25 shown. It will be understood that annular piston 23 is rotatable with drum 14 but axially movable with respect to drum 14.

Closure member 17 is shaped to provide a cylinder 26 extending into clutch chamber 21 and adapted to receive an annular piston 27. Piston 27 has bolted thereto a cone clutch member 28 and is provided with an extension or clutch backing member 29 having a clutch facing 30 thereon. A bolt 31 and sleeve 32 fixed to closure member 17 have affixed thereto a cone clutch backing member 33. The bolt 31 and sleeve 32 extend through an opening in extension 29 of piston 27 such that piston 27 will be rotated with closure member 17 but will be axially movable with respect to member 17.

A clutch hub 34 splined to shaft 50 carries a clutch plate 35, the plate 35 being splined to hub 34 so as to rotate with hub 34 but being axially movable with respect to the axis of rotation of the hub. Plate 35 extends radially outwardly from clutch hub 34 so as to be positioned in the path of travel of clutch facings 24 and 30. A clutch hub 36 splined to a drive sleeve 37 has splined thereto a conical clutch member 38, the member 38 extending between conical clutch member 28 and backing member 33.

Drive sleeve 37 drives an impeller member 39 of fluid torque converter unit A, the impeller 39 having blades 40 supported thereby and by a ring member 41. Radially outwardly of blades 40 are first stage turbine blades 42 supported upon ring members 43 and 44. Reaction blades 45 are fixed to housing 100 and are also supported upon a ring member 46. Second stage turbine blades 47 are supported upon ring member 44 and a turbine member 48 fixed to a hub 49. A one-way clutch 51 is disposed between turbine hub 49 and intermediate shaft 50 in such a manner that turbine 48 will drive shaft 50 whenever the turbine tends to run faster than shaft 50. However, in the event that shaft 50 tends to run faster than turbine 48, the one-way clutch 51 will release to permit shaft 50 to turn without driving the turbine.

In the arrangement shown in Figure 1, fluid pressure may be admitted to cylinder 26 to apply the cone clutch 38 through a passage 55, a passage 56 in a housing sleeve 101, a port 57, annular recess 58 in cylinder 20, and a port 59. In the event that fluid pressure is admitted to cylinder 26 the piston 27 will move axially to cause conical member 28 to force conical clutch member 38 against conical backing member 33 to drive sleeve 37 and impeller 39. It will be noted that such axial motion of piston 27 will result in a similar axial motion of piston extension or clutch backing member 29 and clutch facing 30. Due to the position of backing member 33 in clutch chamber 21, the cone clutch 38 will be fully engaged before facing 30 can press clutch plate 35 against clutch face 24. Clutch plate 35 may be moved axially on its spline connection to clutch hub 34, but the facing 30 will not cause sufficient axial motion of clutch plate 35 to press the plate 35 against clutch facing 24. Thus, with fluid pressure supplied to cylinder 26, and with cylinder chamber 22 connected to exhaust, cone clutch 38 only will be applied to drive the shaft 50 through torque converter unit A.

Fluid under pressure may be supplied to cylinder chamber 22 of Figure 1 by way of a passage 60, a passage 61 in housing sleeve 101, a port 62, annular recess 63 in cylindrical boss 20, and a passage 64 provided in cover 17 and clutch drum 14. It will be noted that the diameter of annular piston 23 in cylinder 22 is greater than that of annular piston 27 in cylinder 26. In the event that fluid under pressure is admitted simultaneously to both cylinders 26 and 22, the piston 23 will move to the left as viewed in Figure 1 to force the clutch plate 35 against clutch facing 30 carried by extension 29 of piston 27. It will be understood that there is provided a torque overlap during the interval at which change of drive from one clutch to another is accomplished. Thus, in changing the drive from cone clutch 38 to direct drive clutch 35, the clutch 35 is gripped between clutch facings 30 and 24 before the cone clutch 38 is released. As the assembly including the two pistons 23 and 27 and clutch plate 35 are moved to the left as a unit, the plate 35 picks up the load as fast as the cone clutch 38 is released. The arrangement provides for a smooth transition in drive from one clutch to the other without jerks and without engine run-away. In addition, the use of momentary throttle retarding devices as commonly employed may be discontinued since no engine run-away can occur even though the shift is accomplished without retarding the engine throttle. A series of coil springs 65, one of which is shown in Figure 1, are disposed between piston 23 and extension 29 of piston 27 to release the clutches when fluid pressure is exhausted from cylinders 22 and 26.

At the radially outer portion of the rotatable clutch drum and cover assembly are provided three centrifugally controlled check valves 66, 67 and 68. Valve 66 is connected to cylinder chamber 26 by a passage 69. Check valve 67 is connected to a chamber 70 adjacent piston extension 29, and check valve 68 is connected to cylinder 22. The function of these valves is to provide an auxiliary dump for exhaust of fluid from the chambers to which they are connected to facilitate proper operation by preventing any fluid from being trapped in such chambers due to centrifugal force effect. Thus, in the event that passage 60 is connected to exhaust fluid pressure from cylinder 22, there will be a drop in pressure in cylinder 22 and consequently a drop in pressure acting upon the ball check valve 68. The valve 68 will be acted upon by centrifugal force to permit leakage of fluid from chamber 22 through the valve so that no fluid will be trapped in chamber 22 due to centrifugal force action which tends to throw the oil outwardly even though passage 62 may be connected to exhaust through passage 60. Valves 66 and 67 act in a similar manner to permit exhaust of fluid from chambers 26 and 70 after chamber 26 has been connected to exhaust by way of passage 55. The centrifugally operated dump valves assure that there will be not clutch drag or malfunction arising as a result of centrifugal force action upon any residual oil which may be present when exhaust of either servo is called for.

In Figure 1A there is shown a manually shiftable slide gear unit adapted to provide direct forward drive, neutral, or reverse reduction drive. A gear 75 splined to intermediate shaft 50 carries clutch teeth 76. Load shaft 105 is provided with an enlarged spline 77 having a slide member 78 carried by splines 77, the member 78 being axially movable but non-rotatable with respect to member 77. Member 78 has formed thereon clutch teeth 79 and a gear 80. A gear 81, axially movable and rotatably supported upon a shaft 82 is in mesh with a gear 85 rotatably supported upon a shaft 86. An annular extension 83 on gear 81 fits into an annular groove 84 in slide member 78 so that gear 81 will move axially upon shaft 82 when slide member 78 is moved axially upon splines 77. A gear 87 formed integrally with gear 85 is adapted to mesh with gear 80 when the slide member 78 is moved to establish reverse drive. In Figure 1A, the shaft 86 and gears 85 and 87 carried thereby are offset from their normal position for the purposes of illustration. A synchronizer cone 88 carried by shaft 105 is spring biased by a spring 89 to contact a cone 90 formed on gear member 75 to assist in synchronizing the speed of rotation of gear member 75 and shaft 105 to prevent clash during engagement of clutch teeth 76 and 79. In Figure 1A, clutch teeth 76 and 79 are engaged to provide direct drive. For neutral, member 78 may be moved rearwardly to disengage clutch teeth 76 and 79. For reverse, member 78 may be moved further to the rear (to the right in Figure 1A) to mesh gear 81 with gear 75 and to mesh gear 80 with gear 87. An arm 91 fixed to a rock shaft 92 will control the position of slide member 78 upon spline 77. Shaft 92 may be controlled through any suitable linkage (not shown) connected to a drive selector lever 99 (see Figure 2) located in the vehicle cab.

Figure 2:
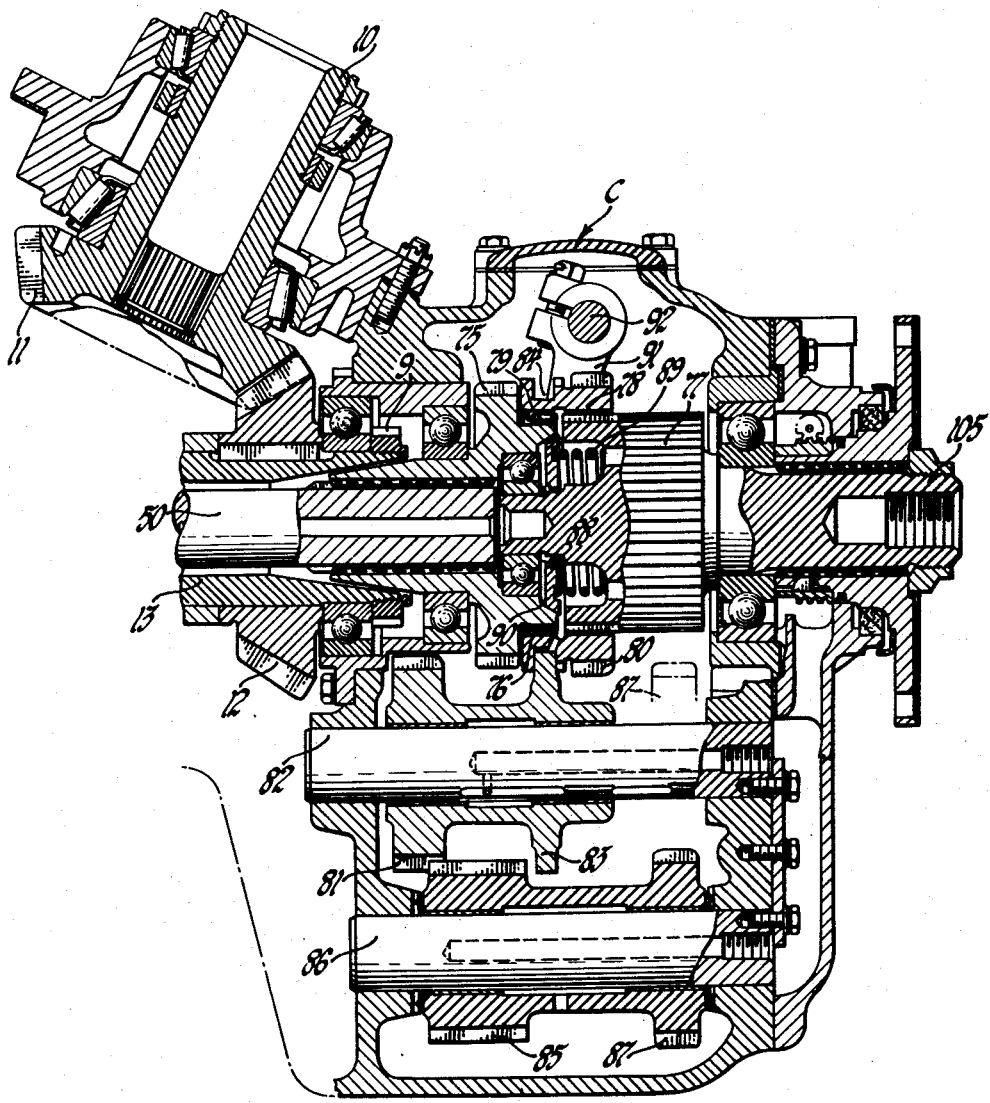
Figure 2 is a view of the control handle for controlling the slide gear unit with the casing partially broken away.

In Figures 2 and 2A there is shown a drive selector lever 93 which extends through a slot 94 in a casing 95, there being a switch 96 supported upon casing 95 and adapted to be controlled by lever 93. A shaft 97 in casing 95 supports a hub 98 having an extension 99 thereon. Lever 93 is bolted to hub 98 by a bolt 102 such that the lever may be rocked on bolt 102 with respect to hub 98, but movement of lever 93 in slot 94 will rotate hub 98 and link extension 99 on shaft 97. The shaft 92 of Figure 1A may carry an arm (not shown) adapted to be connected to link 99 of Figure 2 by any suitable linkage (not shown) such that movement of lever 93 in slot 94 will cause slide member 78 to be moved axially upon splines 77. A spring 103 yieldably biases lever 93 toward the slots 94A, 94B, 94C such that the lever 93 will extend into the selected slot when released by the vehicle operator. Slot 94A represents the forward drive position of lever 93. Slot 94B represents the neutral position of lever 93. Slot 94C represents the reverse drive position of lever 93. With the lever and switch arrangement shown in Figure 2, the switch 96 will be closed whenever lever 93 is being moved through slot 94 to change the drive condition of the slide gear unit. With the lever 93 positioned in any of the slots 94A, 94B, or 94C, the switch 96 will be open.

In Figure 3 there is shown a schematic diagram of the control system for controlling the admission of fluid pressure to the servo chambers 26 and 22 of Figure 1. An engine driven pump 53, which may be driven by a gear 9 of Figure 1A, may draw oil from a sump (not shown) through a suction passage 52 and deliver the oil under pressure to a supply passage 54. The pump may contain a pressure regulator valve (not shown) for maintaining a constant pressure in passage 54. A first solenoid valve 106 is arranged to control the admission of pressure to and exhaust of pressure from passage 55, the passage 55 being connected to servo chamber 26 of Figure 1 as heretofore explained and to a second solenoid valve 122. As shown, valve 106 is formed of a pair of spaced lands 107 and 108 joined by a reduced stem section 109 and disposed in a valve bore 110 provided in a valve body 111. The valve body is provided with ports 112, 113, 114, 115 and 116. Port 112 is an exhaust port. Port 113 connects the valve bore 110 to pressure supply passage 54. Port 114 connects valve bore 110 to passage 55. Port 115 is connected to exhaust port 116 by a passage 117. A stem 118 fixed to land 107 extends into a solenoid coil 119, there being a spring seat 120 fixed to stem 118. A spring 121 seated upon seat 120 on coil 119 yieldably urges the stem 118 and valve 106 to a position wherein port 115 is blocked off from port 117 and port 113 is connected to port 114 to admit fluid under pressure from passage 54 to passage 55. When the solenoid 119 is energized, stem 118 moves downwardly against the action of coil spring 121 to the position illustrated in Figure 3. As shown, land 107 blocks off pressure supply port 113, while passage 55 is connected to exhaust through ports 114, 115, passage 117 and port 116.

A second solenoid valve 122 controls the admission of fluid pressure to and exhaust of pressure from passage 60, which as heretofore described is the pressure supply passage for clutch servo chamber 22. Valve 122 is composed of a pair of lands 123 and 124 joined by a reduced portion 125 and disposed in a valve bore 126 of a valve body 127. A stem 128 fixed to land 123 extends through a solenoid coil 129, there being a spring seat 130 fixed to stem 128. A spring 131 yieldably biases valve 122 to the position shown wherein land 124 blocks off passage 55 from passage 60. As shown, the valve body 127 has ports 132, 133, 134, 135 and 136 communicating with bore 126. Ports 132 and 136 are exhaust ports. Port 133 communicates with port 132 by way of a passage 137. Port 134 connects the valve bore 126 to direct drive clutch apply passage 60. Port 136 connects the valve bore 126 to pressure supply passage 55 controlled by valve 106. When solenoid coil 129 is de-energized, valve 122 is positioned by spring 131 in the position shown in Figure 3 wherein direct drive clutch apply passage 60 is blocked off from passage 55 and is connected to exhaust by way of ports 134, 133, passage 137 and port 132. When solenoid 129 is energized, pressure from passage 55 will be admitted to passage 60 by way of ports 135 and 134.

To control the valves 106 and 122 there is provided a battery 138 adapted to be connected and disconnected from solenoid 119 by means of switch 96 controlled by gear box control handle 93. Switch 96 will be closed to energize solenoid 119 during movement of shift lever 93 to change the drive condition of the transmission slide gear unit C. Upon completion of the change of drive condition of the slide gear unit, shift lever 93 will be positioned in one of the selected slots 94A, 94B or 94C of Figure 2A by spring 103 to open switch 96. Thus, during movement of shift lever 93 in slot 94 of Figure 2A, valve 106 will exhaust passage 55 through ports 114, 115 and 116. Upon completion of the shift, valve 106 will admit fluid pressure from passage 54 to passage 55. To control the valve 122, two switches are provided in series. A switch 139 is a governor operated switch which will be open at speeds below a predetermined vehicle speed and closed at speeds above a predetermined vehicle speed; for example, 18 miles per hour. The governor switch 139 is of a type well known in the art and does not constitute a part of this invention except insofar as its use in the system is concerned. A second switch 140 in series with switch 139 is normally colsed but may be opened by pressing an accelerator pedal 141 downwardly past its normal full throttle position. When the accelerator pedal 141 is pressed downwardly beyond its normal full throttle position, a stem 142 carried by pedal 141 will open switch 140. Upon release of the accelerator pedal from this extreme position, a spring (not shown) will close switch 140. The accelerator pedal 141 is illustrated in its extreme fully depressed position in Figure 3.

*Operation*

Assuming the vehicle is standing still with the shift lever 93 in the forward drive position in slot 94A of Figure 2A, the switch 96 will be open, thereby de-energizing solenoid coil 119 and permitting spring 121 to position valve 106 to admit fluid under pressure from pressure passage 54 to converter drive clutch apply passage 55. Pressure in passage 55 is supplied to chamber 26 to apply cone clutch 38 to establish drive through the torque converter unit A in the manner heretofore explained. The governor controlled switch 139 will be open and switch 140 will be closed. Solenoid 129 will be de-energized and direct drive clutch apply passage 60 will be connected to exhaust through ports 134, 133, and 132. The direct drive clutch chamber 22 will therefore be connected to exhaust, the direct drive clutch being released. Upon acceleration of the vehicle to a predetermined vehicle speed, the governor controlled switch 139 will close, thereby energizing solenoid 129 and positioning valve 122 to admit fluid under pressure from passage 55 to direct drive clutch apply passage 60 by way of ports 135 and 134. Oil under pressure is conducted to servo chamber 22 as heretofore explained to cause piston 23 to engage plate clutch 35 and to move the clutch 35 against facing 30 to release the cone clutch 38, the load being taken on by clutch 35 without torque interruption so that shift under torque with no engine runaway is accomplished. In the event that a "forced downshift" from direct drive to converter drive is desired, switch 140 is opened by pressing the accelerator 141 past its full throttle position. Solenoid coil 129 is de-energized, thereby permitting spring 131 to position valve 122 to connect clutch chamber 22 and passage 60 to exhaust through ports 134, 133, 132, even though the governor controlled switch 139 is positioned for direct drive. Upon release of pressure in chamber 22, valve 68 will open due to centrifugal force action and dump any residual fluid from chamber 22. It will be understood that as fluid pressure is released from chamber 22, piston 27 will move to engage cone clutch 38 for establishing torque converter drive.

For neutral, the lever 93 of Figure 2A is placed in slot 94B. With the lever 93 in slot 94B, a positive neutral is had by positioning the slide member 78 of gear unit C out of mesh with gear 87 and by disengagement of clutch teeth 76—79. In the movement of lever 93 from its forward drive to its neutral position, switch 96 is closed so as to connect passage 55 to exhaust by way of ports 114, 115 and 116 of valve 106. Since valves 106 and 122 are in series connection, the valve 106 will establish neutral even though valve 122 may be positioned for direct drive operation. As the pressure in chamber 26 and any pressure which may exist in chamber 70 drops off, the centrifugal dump valves 66 and 67 open to dump any residual oil which may be trapped in the chambers. Dump valve 67 will open after dump valve 66 has reduced the pressure in chamber 26.

For reverse, the lever 93 is positioned in reverse slot 94C, thereby engaging gears 75—81 and 80—87 of the slide gear box. In moving the lever 93 from neutral to reverse, the solenoid 119 will again be energized to position valve 106 to exhaust pressure from passage 55 as heretofore explained. With lever 93 positioned in slot 94C, switch 96 will again be opened, thereby permitting spring 121 to position valve 106 to admit pressure to converter clutch apply passage 55 to engage cone clutch 38.

The clutching arrangement heretofore described is compact, simple, and reliable in operation. It is readily accessible for purposes of maintenance and repair and can quickly be assembled and disassembled for such purposes. The control system is simple, compact and inexpensive. The arrangement whereby shift under torque is accomplished is of advantage because shift from direct to converter drive can be accomplished without relaxing the accelerator pedal.

It will be understood that the engagement of the clutch 35 is accomplished in two stages. In the first stage, the piston 23 moves clutch 35 against facing 30 of the extension or backing member 29 to provide initial engagement of clutch 35. In the second stage, the piston 23, clutch 35, and backing member 29 move as a unit, the cone clutch 38 thereupon being released. Upon completion of engagement of clutch 35, the extension or backing member 29 is in abutment with the rotatable clutch housing cover 19. Due to this action, there is provided an accumulator effect which in the initial engagement of clutch 35 and release of clutch 38 prevents excessive pressure from being applied to clutch 35. Upon completion of the engagement of clutch 35, with the backing member 29 in engagement with housing cover 19, the pressure engaging clutch 35 will rise because the backing member 29 can no longer move. In this manner, the shift from clutch 38 to clutch 35 is accomplished smoothly without jerks and under torque without engine runaway.

The preceding description recites the advantages and useful results of the invention, and there has been embodied therein a number of novel features in combination, which are subject to changes in the specific form of structure and arrangement without departing from the spirit and scope thereof, as set forth in the appended claims.

What is claimed is:

1. In a transmission, first and second shafts, a drive connection for connecting said shafts to each other through one torque path including a first clutch, a drive connection for connecting said shafts to each other through a second torque path including a second clutch, first and second fluid pressure responsive servo motors for actuating said clutches, respectively, a fluid pressure source, valve means for connecting said first servo motor to said source to engage said first clutch, valve means for connecting said second servo motor to said fluid pressure source to engage said second clutch, and means carried by said first servo motor and disposed in the path of travel of said second servo motor, said second clutch including a movable clutch member, said second servo motor being effective to force the movable clutch member of said second clutch against said last mentioned means to release said first clutch during engagement of said second clutch irrespective of the effect of fluid pressure delivered to said first servo motor by said first-mentioned valve means.

2. In a transmission, first and second shafts, a drive connection adapted to connect said shafts to each other through one torque path including a first clutch, a drive connection adapted to connect said shafts to each other through a second torque path including a second clutch, first and second pistons for actuating said clutches, respectively, servo chambers associated with said pistons, respectively, a fluid pressure source, valve means for admitting fluid pressure from said source to the servo chamber associated with said first piston servo chamber to engage said first clutch, valve means for connecting the servo chamber associated with said second piston to said source to engage said second clutch, said second clutch including a movable clutch member, and means carried by said first piston and disposed in the path of travel of said second piston, said second piston being effective to force the movable clutch member of said second clutch against said last mentioned means to release said first clutch upon engagement of said second clutch irrespective of the effect of fluid pressure delivered to said first piston servo chamber by said first-mentioned valve means.

3. In a transmission, first and second shafts, a drive connection for connecting said shafts to each other including a first clutch, a second drive connection for connecting said shafts to each other including a second clutch, first and second pistons for actuating said clutches, respectively, servo chambers associated with said pistons, respectively, a fluid pressure source, valve means for admitting fluid pressure from said source to the servo chamber associated with said first piston to engage said first clutch, valve means for admitting fluid pressure from said source to the servo chamber associated with said second piston to engage said second clutch, said second clutch including a movable clutch member, and an extension formed integrally with said first piston and disposed in the path of travel of said second piston, said extension providing a backing member for the movable member of said second clutch, said second piston being effective to force the movable member of said second clutch against said extension to engage said second clutch and to release said first clutch irrespective of the effect of fluid pressure delivered to said first piston servo chamber by said first-mentioned valve means.

4. In a transmission, first and second shafts, a clutch housing rotatably driven by said first shaft forming a clutch chamber, torque transfer means including first and second clutches disposed in said clutch chamber selectively operable for connecting said second shaft to said clutch housing through different torque paths, said second clutch including a movable clutch member, first and second pistons for actuating said clutches, respectively, disposed within said housing, servo chambers associated with said pistons, respectively, an extension on said first piston providing a backing member for the movable member of said second clutch, a fluid pressure source, valve means for admitting fluid pressure from said source to the servo chamber associated with said first piston to engage said first clutch, valve means for admitting fluid pressure from said source to said second servo chamber to engage said second clutch, said second piston being effective in its clutch engaging action to force the movable member of said second clutch against said backing member to move said first piston to release said first clutch irrespective of the effect of fluid pressure delivered to said first-mentioned servo chamber by said first-mentioned valve means.

5. In a transmission, first and second shafts, a clutch housing rotatably driven by said first shaft forming a clutch chamber, torque transfer mechanism including first and second clutches disposed in said clutch chamber selectively operable for connecting said second shaft to said clutch housing through different torque paths, said second clutch including a movable clutch member, first and second pistons for actuating said clutches, respectively, disposed within said housing, servo chambers associated with said pistons, respectively, an extension on said first piston providing a backing member for the movable member of said second clutch, a fluid pressure source, valve means for admitting fluid pressure from said source to the servo chamber associated with said first piston to engage said first clutch, valve means for admitting fluid pressure from said source to said second servo chamber to engage said second clutch, said second piston being effective in its clutch engaging action to force the movable member of said second clutch against said backing member to move said first piston to release said first clutch irrespective of the effect of fluid pressure delivered to said first piston servo chamber by said first-mentioned valve means, said first piston being movable laterally with respect to the axis of rotation of said clutch housing during initial engaging action of said second clutch, said first piston being in abutment with said clutch housing upon completion of engagement of said second clutch.

6. In a transmission, first and second shafts, a clutch housing rotatably driven by said first shaft, means forming a first drive connection for connecting said second shaft to said housing through one torque path including a first clutch disposed within said housing, means forming a second drive connection for connecting said second shaft to said housing through a second torque path including a second clutch disposed within said housing, said second clutch including a movable clutch member, first and second pistons for actuating said first and second clutches, respectively, means connecting said pistons, respectively, to said clutch housing for rotating said pistons with said housing and for permitting lateral motion of said pistons with respect to the axis of rotation of said clutch housing, servo chambers associated with said pistons, respectively, means carried by said first piston extending into the path of travel of said second piston and constituting a backing member for the movable member of said second clutch, a fluid pressure source, valve means for admitting fluid pressure from said source to the servo chamber associated with said first piston to engage said first clutch, valve means for admitting fluid pressure from said source to the servo chamber associated with said second clutch to engage said second clutch, said second piston being effective in its clutch engaging action to force the movable member of said second clutch against said backing member to release said first clutch irrespective of the effect of fluid pressure delivered to said first piston servo chamber by said first-mentioned valve means.

7. In a transmission, first and second shafts, a clutch housing rotatably driven by said first shaft, means forming a drive connection for connecting said second shaft to said housing including a first clutch, means forming a second drive connection for connecting said second shaft to said housing including a second clutch, said second clutch including a movable clutch member, first and second pistons for actuating said clutches, respectively, means connecting said pistons, respectively, to said clutch housing for rotating said pistons with said housing and for permitting lateral motion of said pistons with respect to the axis of rotation of said clutch housing, servo chambers associated with said pistons, respectively, means carried by said first piston extending into the path of travel of said second piston and constituting a backing member for the movable member of said second clutch, a fluid pressure source, valve means for admitting fluid pressure from said source to the servo chamber associated with said first piston to engage said first clutch, valve means for admitting fluid pressure from said source to the servo chamber associated with said second piston to engage said second clutch, said second piston being effective in its clutch engaging action to force the movable member of said second clutch against said backing member to release said first clutch irrespective of the effect of fluid pressure delivered to the servo chamber associated with said first piston by said first valve, said first piston being movable laterally with respect to the axis of rotation of said housing during initial engagement of said second clutch to release said first clutch, said first piston being disposed in abutment with said housing upon completion of engagement of said second clutch.

8. In a transmission, first and second shafts, torque transfer means for connecting said shafts to each other through one torque path including a first clutch, torque transfer means for connecting said shafts to each other through a second torque path including a second clutch, said second clutch including a movable clutch member, first and second fluid pressure responsive servo motors for actuating said clutches, respectively, a fluid pressure source, a first valve for controlling the admission of fluid pressure to and exhaust of fluid pressure from said first servo motor, a second valve for controlling the admission of fluid pressure to and exhaust of fluid pressure from said second servo motor, said second valve being connected in series with said first valve, means yieldably biasing said first valve to position said first valve to deliver fluid pressure to said first servo motor to apply said first clutch and to deliver fluid pressure to said second valve, means yieldably biasing said second valve to connect said second servo motor to exhaust, means operative to position said second valve to deliver fluid pressure to said second servo motor to engage said second clutch, and means carried by said first servo motor disposed in the path of travel of said second servo motor, said second servo motor being effective to force the movable member of said second clutch against said last mentioned means to release said first clutch during engagement of said second clutch irrespective of the effect of fluid pressure acting upon said first servo motor.

9. In a transmission, first and second shafts, torque transfer means for connecting said shafts to each other through one torque path including a first clutch, torque transfer means for connecting said shafts to each other through a second torque path including a second clutch, said second clutch including a movable clutch member, first and second fluid pressure responsive servo motors for actuating said clutches, respectively, a fluid pressure source, a first valve for controlling the admission of fluid pressure to and exhaust of fluid pressure from said first servo motor, a second valve connected in series with said first valve for controlling the admission of fluid pressure to and exhaust of fluid pressure from said second servo motor, means yieldably positioning said first valve to direct fluid pressure to said first servo motor to apply said first clutch and to deliver fluid pressure to said second valve, means yieldably positioning said second valve to connect said second servo motor to exhaust, means operative to position said second valve to deliver fluid pressure to said second servo motor to engage said second clutch, means carried by said first servo motor disposed in the path of travel of said second servo motor, said second servo motor being effective to force the movable member of said second clutch against said last mentioned means to release said first clutch during engagement of said second clutch irrespective of the effect of fluid pressure acting upon said first servo motor, and means operative to position said first valve to connect said first servo motor and the supply of fluid pressure to said second valve to exhaust to establish release of both of said clutches irrespective of the position of said second valve.

10. In a transmission, first and second shafts, torque transfer means including first and second clutches selectively operable for connecting said first shaft to said second shaft through different torque paths, said second clutch including a movable clutch member, first and second pistons for actuating said clutches, respectively, servo chambers associated with said pistons, respectively, a fluid pressure source, a first valve for controlling the admission of fluid pressure to and exhaust of fluid pressure from the servo chamber associated with said first piston, a second valve connected in series with the first valve for controlling the admission of fluid pressure to and exhaust of fluid pressure from the servo chamber associated with said second piston, means positioning said first valve to deliver fluid pressure to the first piston servo chamber to apply said first clutch and to deliver fluid pressure to said second valve, means for positioning said second valve to connect said second piston servo chamber to exhaust, an extension formed integrally with said first piston and positioned in the path of travel of said second piston, said extension providing a backing member for the movable member of said second clutch, and means for positioning said second valve to admit fluid pressure to said second piston servo chamber, said second piston being movable in response to fluid pressure in said last mentioned chamber to force the movable member of said second clutch against said backing member to engage said first clutch and release said first clutch irrespective of the action of fluid pressure in said first piston servo chamber.

11. In a transmission, first and second shafts, torque transfer means including first and second clutches selectively operable for connecting said first shaft to said second shaft through different torque paths, said second clutch including a movable clutch member, first and second pistons for actuating said clutches, respectively, servo chambers associated with said pistons, respectively, a fluid pressure source, a first valve for controlling the admission of fluid pressure to and exhaust of fluid from said first piston servo chamber, a second valve connected in series with said first valve for controlling the admission of fluid pressure to and exhaust of pressure from said second piston servo chamber, means positioning said first valve to deliver fluid pressure to said first piston servo chamber to apply said first clutch and to deliver fluid pressure to said second valve, means positioning said second valve to connect said second piston servo chamber to exhaust, an extension carried by said first piston and positioned in the path of travel of said second piston, said extension providing a backing member for the movable member of said second clutch, means for positioning said second valve to admit fluid pressure to said second piston servo chamber, said second piston being movable in response to fluid pressure in said last mentioned chamber to force the movable member of said second clutch against said backing member to engage said first clutch and release said first clutch irrespective of the action of fluid pressure in said first piston servo chamber, and means for positioning said first valve to connect said first piston servo chamber and the supply of fluid pressure to said second valve to exhaust to establish release of both of said clutches irrespective of the position of said second valve.

12. In a transmission, first and second shafts, a clutch housing forming a clutch chamber, torque transfer means including first and second clutches disposed in said clutch chamber selectively operable for connecting said second shaft to said clutch housing through different torque paths, said second clutch including a movable clutch member, first and second pistons for actuating said clutches, respectively, disposed within said housing, means connecting said first shaft to said housing to rotate said housing, servo chambers associated with said pistons, respectively, an extension carried by said first piston providing a backing member for the movable member of said second clutch, a fluid pressure source, valve means for controlling the admission of fluid pressure to and exhaust of fluid pressure from said first piston servo chamber, valve means for controlling the admission of fluid pressure to and exhaust of fluid pressure from said second piston servo chamber, said second piston being movable in its clutch engaging action to force the movable member of said second clutch against said backing member to release said first clutch irrespective of the effect of fluid pressure in said first piston servo chamber, and centrifugally controlled auxiliary dump valves carried by said housing for dumping residual oil from said servo chambers, respectively, upon release of fluid pressure from said servo chambers, respectively.

13. In a transmission, first and second shafts, a slide gear unit adapted to provide forward, neutral and reverse conditions of operation, a control handle movable to select forward, neutral or reverse, torque transfer means including first and second clutches selectively operable to connect said second shaft to said first shaft through different torque paths, said second clutch including a movable clutch member, first and second servo motors for actuating said clutches, respectively, a fluid pressure source, a first valve for controlling the admission of fluid pressure to and exhaust of fluid pressure from said first servo motor, a second valve for controlling the admission of fluid pressure to and exhaust of fluid pressure from said second servo motor, means for positioning said first valve to deliver fluid pressure to said first servo motor to apply said first clutch and to deliver fluid pressure to said second valve, means for positioning said second valve to connect said second servo motor to exhaust, additional means for positioning said second valve to deliver fluid pressure to said second servo motor to engage said second clutch, means extending into the path of travel of the movable member of said second clutch forming a backing member for the movable member of said second clutch, said second servo motor being effective to force the movable member of said second clutch against said backing member to release said first clutch during engagement of said second clutch irrespective of the effect of fluid pressure acting on said first servo motor, and means controlled by said control handle in its movement to change the drive condition of the transmission for positioning said first valve to connect said first servo motor to exhaust to release both of said clutches irrespective of the position of said second valve.

14. The combination set forth in claim 13 including manually operable means connected in series with said additional means selectively operable to render said additional means incapable of positioning said second valve to direct fluid pressure to said second servo motor.

15. In a transmission, first and second shafts, torque transfer mechanism including first and second clutches selectively operable to connect said second shaft to said first shaft through different torque paths, said second clutch including a movable clutch member, first and second servo motors for actuating said clutches, respectively, a fluid pressure source, a first solenoid valve for controlling the admission of fluid pressure to and exhaust of fluid pressure from said first servo motor, a second solenoid valve for controlling the admission of fluid pressure to and exhaust of fluid pressure from said second servo motor, means positioning said first solenoid valve to deliver fluid pressure to said first servo motor to engage said first clutch and to deliver fluid pressure to said second solenoid valve, means positioning said second solenoid valve to connect said second servo motor to exhaust, a battery, a switch effective in one position to energize the solenoid of the second solenoid valve to position said second solenoid valve to deliver fluid pressure to said second servo motor to engage the movable member of said second clutch, a backing member for the movable member of said second clutch, said second servo motor being effective to force said movable member of said second clutch against said backing member to release said first clutch as said second clutch is engaged irrespective of the effect of fluid pressure acting in said first servo motor.

16. The combination set forth in claim 15 including a manually operable switch selectively operable to render said first-mentioned switch ineffective to energize the solenoid of said second solenoid valve.

17. The combination set forth in claim 15 including an accelerator pedal, an accelerator pedal controlled switch in series with said first-mentioned switch and operable in an extreme position of said accelerator pedal to render said first-mentioned switch ineffective to energize the solenoid of said second solenoid valve.

18. The combination set forth in claim 15 including a manually controlled switch effective when closed to energize the solenoid of said first solenoid valve to position said first solenoid valve to connect said first servo motor and the supply of fluid pressure to said second solenoid valve to exhaust.

19. In a transmission, first and second shafts, a drive connection for connecting said shafts to each other through one torque path including a first clutch, a drive connection for connecting said shafts to each other through a second torque path including a second clutch, a first piston for actauting said first clutch, a second piston for actuating said second clutch, said second piston being of greater diameter than said first piston and arranged outside the path of travel of said first piston in assembled relationship, a clutch backing member carried by said first piston and extending into the path of travel of said second piston, servo chambers associated with said pistons, respectively, a fluid pressure source, valve mean for admitting fluid pressure from said source to the servo chamber associated with said first piston to engage said first clutch, valve means for admitting fluid pressure from said source to the servo chamber associated with said second piston to engage said second clutch, said second piston being effective to force said second clutch against said backing member to engage said second clutch and to release said first clutch irrespective of the effect of fluid pressure delivered to the servo chamber associated with said first piston by said first valve.

References Cited in the file of this patent

UNITED STATES PATENTS 2,505,450    Wemp  ---------------- Apr. 25, 1950